US005360637A

United States Patent [19]
Jacoboni et al.

[11] Patent Number: 5,360,637
[45] Date of Patent: Nov. 1, 1994

[54] VAPOR-PHASE DEPOSITION OF FLUORINE GLASS

[75] Inventors: Charles P. Jacoboni, Saint Jamme; Brigitte R. J. Boulard, Le Mans, both of France

[73] Assignee: Centre National de la Recherche Scientifique (CNRS), Paris, France

[21] Appl. No.: 158,479

[22] PCT Filed: Feb. 2, 1990

[86] PCT No.: PCT/FR90/00083
§ 371 Date: Sep. 26, 1991
§ 102(e) Date: Sep. 26, 1991

[87] PCT Pub. No.: WO90/08743
PCT Pub. Date: Aug. 9, 1990

Related U.S. Application Data

[63] Continuation of Ser. No. 730,893, Sep. 26, 1991, abandoned.

[30] Foreign Application Priority Data

Feb. 2, 1989 [FR] France .................. 89 01368

[51] Int. Cl.$^5$ .................. C23C 16/22; B32B 17/00
[52] U.S. Cl. .................. 427/255; 427/255.1; 65/DIG. 16; 428/432; 428/691
[58] Field of Search .................. 427/255, 255.1; 65/DIG. 16; 428/432, 691

[56] References Cited

U.S. PATENT DOCUMENTS

| | | | |
|---|---|---|---|
| 4,328,318 | 5/1982 | Miranday et al. | 501/40 |
| 4,521,523 | 6/1985 | Aubourg et al. | 501/30 |
| 4,610,708 | 9/1986 | Sarhangi et al. | 65/3.12 |

FOREIGN PATENT DOCUMENTS 60-155549 8/1985 Japan.

OTHER PUBLICATIONS

Glass Technology vol. 28, No. 1, Feb. 1, 1987, H. Poignant et al. "The preparation of fluoride glass single mode fibres".
Material Science Forum, vols. 32-33, 1988, Trans Tech Publications, B. Boulard et al: "Chemical vapour deposition of fluorides, molecular dynamics simulation of amorphous systems", pp. 61-68.
Revue de Physique Appliquee, vol. 21, No. 11, Nov. 1986, J. Lucas: "Les nouveaux verres", pp. 683-687.
Patent Abstract of Japan, Volum 9, No. 324 (C-320,-(2047), 19 Dec. 1985.

Primary Examiner—Shrive Beck
Assistant Examiner—Bret Chen
Attorney, Agent, or Firm—Cushman, Darby & Cushman

[57] ABSTRACT

A process for the vapor phase deposition of a fluoride containing glass on a substrate, the said fluoride containing glass containing in mole percent with a total of 100%, 30-50 $PbF_2$, 30-50 $GaF_3$, 0-30 $ZnF_2$, 1-5 $MF_2$ wherein M is Mn or Cd, 1-5 $InF_3$, 0-10 $AlF_3$ and 0-10 adjuvant, which involves contacting the substrate with vapors emanating from a molten bath of metallic fluorides comprising a reception bath containing in mole percent with a total of 100%, 9-26 $YF_3$, 19-38 $BaF_2$, 35-40 $InF_3$, 18-25 $M'Fe_2$ wherein M' is Mn, CaI or Zn and 0-10 adjuvant to which reception bath has been added a sufficient amount of a mixture of $PbF_2$, $GaF_3$ and optionally $AlF_3$. The invention also concerns a vitreous composition deposited on a substrate, thus obtained, which is useful as a waveguide in the infrared.

11 Claims, No Drawings

VAPOR-PHASE DEPOSITION OF FLUORINE GLASS

This is a continuation of application Ser. No. 07/730,893, filed on Sep. 26, 1991, which was abandoned upon the filing hereof VAPOR-PHASE DEPOSITION OF FLUORIDE GLASS.

The present invention relates to a process for the vapor phase deposition of a fluoride containing glass on a substrate, as well as to the resulting vitreous composition deposited on a substrate.

It is known that certain mixtures of metallic fluorides have the property of yielding vitrifiable composition. Glasses based on metallic fluorides are generally called fluoride containing glasses.

Fluoride containing glasses have the property of presenting a broad window of transparency (wavelengths generally ranging from 0.3 to 8 micrometers) and in particular an ultra-transparency in the intermediate infrared, clearly greater than that of silica.

The field of use of fluoride containing glasses can then extend from long distance telecommunications using optic fibers at very weak losses, to laser fibers employed in microsurgery.

It is known that the preparation of optic fibers require very high purity materials. In particular, certain cations such as iron, cobalt, nickel etc. must not be present in an amount greater than 10 to 50 parts per million, in order to obtain optic fibers having very weak losses.

The classic process of producing pieces of fluoride containing glasses by fusion and tempering causes significant pollution by contact with the containers employed for the fusion and casting.

It is then very important to be able to prepare fluoride containing glasses by vapor phase deposition in order to avoid such disadvantages.

However, conventional techniques of vapor phase deposition are not useful because of the chemical complexity of vitreous fluoride systems.

In effect fluoride containing glasses admit of at least four constituents. Now, if the composition of the vapor in equilibrium above binary mixtures can generally be foreseen, the introduction of other constituents renders the evaporation more complex and the theoretic ratios of the constituents of the vapor phase are no longer respected. In general, the molten mixture is enriched in one or more constituents less volatile than the others so that the modification of the composition of the liquid being evaporated rapidly leads to departing from the thermic field of the liquidus. It has been observed then that evaporation ceases and that the composition present in the crucible crystallizes.

It is thus that the vapor phase deposition of a glass, based on zirconium fluoride, has been attempted without success; see for example H. Poignant et Coll., Mat. Science Forum, 5, 79-84 (1985).

It has now been discovered that it is possible to vapor phase deposit certain fluoride containing vitreous compositions by melting the constituents of the glass to be deposited in a receptor bath constituted by a molten mixture of fluorides forming itself a vitrifiable composition constituted of elements less volatile than the fluorides of the glass to be deposited. This technique avoids the difficulties encountered in the direct evaporation method, for it has been discovered that the composition of the "reception glass" remains essentially constant, or in any case varies sufficiently little so that it is possible to maintain the bath in the liquid state. It has been found that these results can be obtained when the composition of the reception bath is a vitrifiable composition, that is to say a composition having a behavior analogous to that of a eutectic mixture.

The present invention thus relates to a process for the vapor phase deposition of a fluoride containing glass on a substrate, the said fluoride containing glass having the following composition (in mole %; total 100%)

30-50 $PbF_2$
30-50 $GaF_3$
0-30 $ZnF_2$
1-5 $MF_2$ (M=Mn, Cd)
1-5 $InF_3$
0-10 $AlF_3$
0-10 adjuvant characterized by the fact that the said substrate is contacted with the vapors coming from a molten bath of the metallic fluoride comprising a reception bath having the following composition (in mole %; total 100%)

9-26 $YF_3$
19-28 $BaF_2$
35-40 $InF_3$
18-25 $M'F_2$ (M'=Mn, Cd, Zn)
0-10 adjuvant, and including besides, in the relative amounts indicated above, the other ingredients of the fluoride containing glass to be deposited.

In particular embodiments of the invention the process can still exhibit characteristics, taken singly or in combination, which are explained hereafter.

The initial proportion in mass of the reception bath with respect to the total mass of the initial bath, is sufficiently significant to maintain a sufficiently stable composition of the reception bath. This proportion varies for example from 50% to 90%. Certain constituents of the reception bath, principally $InF_3$, $MnF_2$, $CdF_2$ and optionally the adjuvants, are found in weak proportions in the deposited fluoride containing glass. Zinc fluoride can be a part of the reception bath, but it is then found also, in proportions which can be relatively significant (for example 10-30%) in the deposited glass to which it imparts increased stability.

To obtain the deposit of the vapors coming from the molten bath, the process is carried out, for example, in an enclosure submitted to a dynamic vacuum of $10^{-4}$ to $10^{-3}$ m bars, or $10^{-2}$ to $10^{-1}$ Pa.

The temperature of the molten bath is a temperature sufficient to obtain complete melting of the metallic fluorides. Preferably, the temperature of the molten bath is 50° C. higher than the final melting temperature under the pressure considered. The process is generally carried out at a temperature of 500° to 650° C.

The substrate must generally be heated to a temperature which is however lower than the vitreous transition temperature of the glass being deposited. In effect, a deposit effected on non-heated substrate is not adherent. The optimum temperature of the substrate can be determined in each case by simple routine experimentation. It is generally in the order of 100°-200° C.

The constituent of the substrate can be, for example, selected from among a fluoride containing glass, alumina, silica, vitreous carbon and a metal. Representative fluoride containing glasses capable of serving as a substrate, include, for example, glasses based on zirconium or hafnium fluoride which are described principally in French patent application No. 2.354,977 and 2.384.724.

The vitreous compositions which can be vapor phase deposited in accordance with the process of the present invention are known. They are described principally in European patent application No. 0017566 and in French patent application No. 80.18139 (2.488.873) and 82.02698 (2.521.546).

The adjuvant optionally present in the reception bath and in the glass to be deposited is principally constituted by one or more metallic fluorides, in particular, metallic fluorides of which the metals are in octahedral coordination, as for example, the 3d elements of the periodic classification, or even alkaline fluorides (for example, NaF or LiF) or rare earth fluorides. Representative rare earths, include principally: La, Er, Nd, Yb, Gd, Lu and Pr.

The invention concerns in particular the deposits of fluoride containing glasses such as defined above, not containing any adjuvants or not more than 5%.

The present invention also relates to a vitreous composition deposited on a substrate, which can be obtained principally in accordance with the process described above. The composition is deposited under the form of a film being able to have a thickness of a few tens of micrometers. The compositions thus deposited on the substrate can serve principally as waveguides in the infrared.

The substrate can have any form which depends on the use envisioned.

It can be a question, for example, of a plating or a cylinder;

The substrate can also have the form of a hollow tube on which the fluoride containing glass is deposited interiorly thereof. After a shaping operation, in accordance with known methods, there can be obtained an optic fiber preform, the core of which is constituted by the deposited fluoride containing glass.

The apparatus employed to effect the vapor phase deposition of fluoride containing glasses on a substrate, in accordance with the process of the present invention, is similar to the apparatus classically employed in vapor phase deposition methods. The following is a description of such an apparatus.

The evaporator is constituted by a tubular enclosure, for example of Pyrex glass, submitted to a dynamic vacuum of about $10^{-4}$ m bars ($10^{-2}$ Pa) at the base of the tube and $4 \times 10^{-4}$ m bars ($4 \times 10^{-2}$ Pa) at the top of the tube.

The fluorides are placed in a chemically inert crucible, for example, platinum, arranged on a support and heated by induction using a high frequency coil. An aluminum sample holder is arranged with respect to the upper part of the crucible. The sample holder is fitted with means so as to vary the distance of the sample holder to the crucible. Sealed passages assure the electric connection for heating the sample holder and the entry of the temperature measuring thermocouple in contact with the bottom of the crucible. The thermic conduction phenomena, small for a pressure of $10^{-4}$ m bars cause only a slight reheating of the substrate (in the order of 20° to 30° C.).

The deposits are effected on a polished, optionally chemically cleaned, substrate.

The yield of the operation (deposited mass/total evaporate mass) is a function of the crucible-substrate distance. The minimum distance is limited by the heating effects of the sample holder (by proximity of the high frequency coil) and by a too rapid rate of deposition which leads to crackled deposits.

The optimum distance of the crucible to the sample holder can be determined in each case by simple routine experimentation.

The crucible-substrate distance can be, for example from 4 to 8 cm.

It has been observed that the yield generally increases with the temperature of the substrate, taking into account the limits indicated previously.

The apparatus permits to obtain amorphous deposits in the form of a film having a thickness of 40 to 50 micrometers. The duration of evaporation is generally between 30 to 90 minutes.

Heating of the substrate also permits a less rapid tempering rate and sufficiently long evaporation which includes in a certain measure induces an annealing process of the deposit thus providing more stable vitreous phases.

Control of the deposition rate is necessary to obtain uniform and adherent deposits on the substrate. The temperature rise can be made, for example, under the following conditions:

from 20° to 500° C.: 20° C./min
from 500° to 550° C.: 5° C./min
at 550° C.: 5 min stage
from 550° to 600° C.: 1° C./min The temperature of the crucible is preferably between 550° C. and 580° C. At higher temperatures, the normal evaporation operation can become irregular and the deposit risks splitting or cracking.

The X-ray diffraction spectra have confirmed the vitreous character of the deposits.

The following non-limiting examples illustrate the present invention.

In these examples, the molten baths of fluorides has been heated to a temperature of 550°–570° C. The deposition time was 60 minutes.

The thickness of the resulting deposit was about 40 micrometers.

EXAMPLES 1–8

The composition of the reception bath is as follows (in mole %):

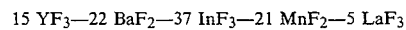

15 $YF_3$—22 $BaF_2$—37 $InF_3$—21 $MnF_2$—5 $LaF_3$

The composition of fluorides to be evaporated, containing essentially $PbF_2$, $ZnF_2$ and $GaF_3$, and optionally some variable amounts of aluminum fluoride, is mixed with the composition of the reception bath. The $PbF_2$, $ZnF_2$ and $GaF_3$ fluorides are present at a rate of 20% in mass, relative to the total mass.

The fluoride mixture (about 15 g) is first melted in a platinum crucible at 750° C. at the interior of a glovebox. After installation of the crucible in the evaporator under an inert gas atmosphere (nitrogen or argon, for example) a dynamic vacuum in the order of $10^{-4}$ to $4 \times 10^{-4}$ m bars is established. The crucible is then brought to a temperature of 550°–570° C., proceeding by stages, as indicated above, in order to constantly maintain the system under equilibrium conditions.

To stop the evaporation, the heating is discontinued, and the temperature of the crucible then rapidly reduces to 400° C. At this moment the secondary pump is cut off. The primary vacuum is maintained for 30 minutes. Reestablishing atmospheric pressure is effected by filling the evaporator with an inert gas.

The substrate is a polished chip of a glass having the following composition:

55 ZnF$_4$—31 BaF$_2$—5 AlF$_3$—5 LaF$_3$—4 NaF

The sizes of the chip are: diameter=25 mm; thickness=2.5 mm. The chip is isolated from the aluminum sample holder by a platinum screen.

The substrate, situated about 6 cm from the top of the crucible and chemically isolated from the sample holder by a platinum ring, is maintained at a temperature lower than the vitreous transition temperature of the deposited glass. A temperature of 100° C. permits to effect the deposit for 60 minutes without onset of crystallization. Vitrification of the deposited composition is immediate, but optionally could be consolidated later by thermal means. After terminating the heating, the substrate is left to cool slowly without external intervention.

The results obtained are set forth in the following table:

glass having the PBF$_2$, GaF$_3$ and AlF$_3$ content defined above.

2. The process of claim 1 wherein the initial mass proportion of said reception bath relative to the total mass of the initial bath is from 50% to 90%.

3. The process of claim 1 which is operated in an enclosure under a dynamic vacuum of $10^{-2}$ to $10^{-1}$ Pa.

4. The process of claim 1 wherein the temperature of said molten bath is from 500° to 650° C.

5. The process of claim 1 wherein the temperature of said molten bath is from 550° to 600° C.

6. The process of claim 1 wherein said substrate is heated to a temperature lower than the vitreous transition temperature of the glass being deposited.

7. The process of claim 1 wherein the constituent of said substrate is selected from the group consisting of a fluoride containing glass, alumina, silica, vitreous carbon and a metal.

| Example No. | % AlF$_3$ added | PbZnGa composition, in moles | Deposited Composition, in mole % | Tg °C. | Tc °C. |
|---|---|---|---|---|---|
| 1 | 0 | 36PbF$_2$, 24ZnF$_2$, 35GaF$_3$ | 11ZnF$_2$, 39PbF$_2$, 44GaF$_3$, 3InF$_3$ 2.9MnF$_2$ | 284 | 354 |
| 2 | 2 | 36PbF$_2$, 24ZnF$_2$, 35GaF$_3$ | 12.5ZnF$_2$, 37 PbF$_2$, 45GaF$_3$, 2.5InF$_3$, 2.8MnF$_2$, 0.6AlF$_3$ | — | 326 |
| 3 | 5 | 36PbF$_2$, 24ZnF$_2$, 35GaF$_3$ | 10ZnF$_2$, 36PbF$_2$, 43.5GaF$_3$, 1.5InF$_3$, 2.3MnF$_2$, 6.5AlF$_3$ | 260 | 320 |
| 4 | 2.5 | 25PbF$_2$, 50ZnF$_2$, 25GaF$_3$ | 25ZnF$_2$, 30PbF$_2$ 36GaF$_3$, 1.2InF$_3$, 1.8MnF$_2$, 5.1AlF$_3$ | — | — |
| 5 | 2.5 | 30PbF$_2$, 50ZnF$_2$, 20GaF$_3$ | 26ZnF$_2$, 35PbF$_2$, 30GaF$_3$, 3InF$_3$, 3.5MnF$_2$, 3.5AlF$_3$ | 290 | 382 |
| 6 | 2.5 | 34PbF$_2$, 40ZnF$_2$, 26GaF$_3$ | 17ZnF$_2$, 34.5PbF$_2$, 43GaF$_3$, 1InF$_3$, 2MnF$_2$, 3.5AlF$_3$ | 280 | 337 |
| 7 | 0 | 30PbF$_2$, 50ZnF$_2$, 20GaF$_3$ | 37PbF$_2$, 30ZnF$_2$, 30.4GaF$_3$, 1.5InF$_3$, 1CdF$_2$ | 287 | 304 |
| 8 | 0 | 20PbF$_2$, 50ZnF$_2$, 30GaF$_3$ | 25.6PbF$_2$, 31.6ZnF$_2$, 39GaF$_3$, 2.5InF$_3$, 1.3CdF$_2$ | — | — |

We claim:

1. A process for the vapor phase deposition of a fluoride containing stable glass on a substrate, said fluoride containing glass containing in mole percent with a total of 100%, 30-50 PbF$_2$, 30-50 GaF$_3$, 0-30 ZnF$_2$, 1-5 MF$_2$ wherein M is Mn or Cd, 1-5 InF$_3$, 0-10 AlF$_3$ and 0-10 adjuvant, said process comprising contacting said substrate with vapors emanating from a molten bath of metallic fluorides comprising a reception bath containing in mole % with a total of 100%, 9-26 YF$_3$, 19-28 BaF$_2$, 35-40 InF$_3$, 18-25 M'F$_2$ wherein M' is Mn, Cd or Zn, and 0-10 adjuvant to which said reception bath has been added a sufficient amount of a mixture of PbF$_2$, GaF$_3$ and optionally AlF$_3$ so as to provide said stable 8. The process of claim 1 wherein the adjuvant optionally present in said reception bath is a metallic fluoride.

9. The process of claim 8 wherein said adjuvant is at least one fluoride selected from the group consisting of a fluoride of 3d elements of the periodic chart, a fluoride of a rare earth metal and an alkaline fluoride.

10. The process of claim 9 wherein said rare earth metal is selected from the group consisting of La, Er, Nd, Yb, Gd, Lu and Pr.

11. The process of claim 1 wherein said reception bath contains zinc fluoride in an amount sufficient so that the deposited fluoride containing glass contains 10-30 mole percent of ZnF$_2$.

* * * * *